United States Patent
Villaire et al.

(10) Patent No.: US 11,105,302 B2
(45) Date of Patent: Aug. 31, 2021

(54) EVAPORATIVE EMISSIONS CONTROL SYSTEM

(71) Applicant: GM GLOBAL TECHNOLOGY OPERATIONS LLC, Detroit, MI (US)

(72) Inventors: William L. Villaire, Clarkston, MI (US); Manoj R. Chaudhari, Clinton Township, MI (US); Edward J. Strzelecki, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/689,858

(22) Filed: Nov. 20, 2019

(65) Prior Publication Data

US 2021/0148309 A1    May 20, 2021

(51) Int. Cl.
| | |
|---|---|
| *F02M 25/08* | (2006.01) |
| *F02D 41/00* | (2006.01) |
| *B60K 15/04* | (2006.01) |
| *B60K 15/03* | (2006.01) |

(52) U.S. Cl.
CPC ...... *F02M 25/089* (2013.01); *F02M 25/0872* (2013.01); *B60K 15/04* (2013.01); *B60K 2015/0325* (2013.01); *B60K 2015/03243* (2013.01); *F02D 41/003* (2013.01); *F02D 41/0032* (2013.01); *F02M 25/08* (2013.01); *F02M 25/0836* (2013.01)

(58) Field of Classification Search
CPC .. F02M 25/089; F02M 25/0872; F02M 25/08; F02M 25/0836; B60K 15/04; B60K 2015/03243; B60K 2015/0325; F02D 41/003; F02D 41/0032

USPC ................ 123/519, 516, 518, 698
See application file for complete search history.

(56) References Cited

U.S. PATENT DOCUMENTS

| | | | | |
|---|---|---|---|---|
| 5,570,672 | A * | 11/1996 | Kunimitsu | ........... B60K 15/035 123/516 |
| 5,769,057 | A * | 6/1998 | Hashimoto | .......... B60K 15/035 123/516 |
| 2010/0294251 | A1* | 11/2010 | Makino | .............. F02M 25/0854 123/519 |
| 2020/0070649 | A1* | 3/2020 | Dudar | .............. B60K 15/03504 |

FOREIGN PATENT DOCUMENTS

JP        2008008238 A  *  1/2008

* cited by examiner

*Primary Examiner* — Mahmoud Gimie
*Assistant Examiner* — Joshua Campbell
(74) *Attorney, Agent, or Firm* — Cantor Colburn LLP

(57) ABSTRACT

An evaporative emissions control system comprising an evaporative emissions control (evap) canister. A fuel vapor feed conduit includes a first end fluidically connected to the evap canister, a second end connected to an internal combustion (IC) engine and a purge valve fluidically connected thereto. A fuel vapor conduit includes a first end fluidically connected to the evap canister and a second end configured to extend into a vehicle fuel tank. A fuel vapor vent valve is fluidically connected to the fuel vapor conduit at the second end thereof. A vapor return system includes a fuel pump fluidically connected to the fuel vapor conduit through an intermediate bypass conduit having a first end fluidically connected to an intermediate portion of the fuel vapor conduit and a second end extending into the vehicle fuel tank and in communication with the vapor return system.

13 Claims, 4 Drawing Sheets

EVAPORATIVE EMISSIONS CONTROL SYSTEM

The subject disclosure relates to an emission control system for a motor vehicle and, more particularly, to an evaporative emissions canister purge system for an emission control system.

Most vehicles powered by an internal combustion (IC) engine include one or more emission control systems. An emission control system reduces undesirable emissions associated with the burning and/or transporting of fossil fuels. Emission control systems may include after treatment systems that treat products of combustion and evaporative control systems that capture vapors that may be emitted by liquid fossil fuels residing in a vehicle fuel tank. Modern vehicles include fuel systems that do not vent directly to the atmosphere. Instead, the fuel systems vent though an evaporative emissions control canister (evap canister) that traps fuel vapor and prevents its release to the atmosphere.

Evap canisters may include activated carbon. Fuel vapor resident in the vehicle fuel tank may be ducted from the tank and into the evap canister where the activated carbon absorbs and stores the fuel vapor. During certain vehicle operation, fresh air is drawn through the evap canister pulling the fuel vapor out of the activated carbon and into the IC engine to be burned. Such an activity regenerates the evap canister and prepares it to store additional fuel vapor from the fuel tank. Vehicle refueling generates a significant fuel vapor load on the evap canister as liquid fuel entering the fuel tank displaces fuel vapor residing above the level of the liquid fuel. Anticipation of this loading directly impacts the required size of the evap canister and, as such, it is desirable to provide an emission control system for a vehicle that manages hydrocarbon loading of the evap canister during a refueling event thereby reducing the necessary size of the canister.

SUMMARY

In one exemplary embodiment, an evaporative emissions control system comprises an evaporative emissions control (evap) canister. A fuel vapor feed conduit includes a first end fluidically connected to the evap canister and a second end connected to an internal combustion (IC) engine. A purge valve is fluidically connected to the fuel vapor feed conduit. A fuel vapor conduit includes a first end fluidically connected to the evap canister and a second end extending into a vehicle fuel tank. A fuel vapor vent valve is fluidically connected to the fuel vapor conduit at the second end. A vapor return system includes a fuel pump fluidically connected to the fuel vapor conduit through an intermediate bypass conduit having a first end fluidically connected to an intermediate portion of the fuel vapor conduit and a second end extending into the vehicle fuel tank and in communication with the vapor return system.

In addition to one or more of the features described herein, the evaporative emissions control system fuel pump comprises an eductor pump.

In addition to one or more of the features described herein, evaporative emissions control system eductor pump includes an inlet fluidically connected to a pressurized source of fuel and a tapered fuel outlet.

In addition to one or more of the features described herein, the evaporative emissions control system vapor return system includes a vapor reservoir fluidically connected to the second end of the intermediate bypass conduit and having the tapered fuel outlet of the eductor pump disposed therein.

In addition to one or more of the features described herein, the evaporative emissions control system vapor return system includes a diffuser fluidically connected to the vapor reservoir, the diffuser being arranged downstream of the tapered fuel outlet of the eductor pump.

In addition to one or more of the features described herein, the evaporative emissions control system further comprises an evaporative emissions control module and a fueling sensor that signals the evaporative emissions control module that a fuel tank refueling event is in progress. Upon receiving a signal of a fuel tank refueling event the evaporative emissions control module operates the fuel pump and draws fuel vapor through the intermediate bypass conduit to the vapor reservoir for mixing with the pressurized fuel flowing from the tapered fuel outlet and condensing at the diffuser.

In addition to one or more of the features described herein, the evaporative emissions control system comprises a fill pipe extending from a fuel inlet accessible from the exterior of the vehicle to a fuel outlet in fluid communication with the vehicle fuel tank. A fill pipe vapor conduit fluidically connects to the fill pipe and has an outlet fluidically connected to the vapor return system.

In another exemplary embodiment, a motor vehicle comprises an internal combustion (IC) engine, a vehicle fuel tank connected to the IC engine and an evaporative emissions control system fluidically connected to the IC engine and the vehicle fuel tank The evaporative emissions control system comprises an evaporative emissions control (evap) canister, a fuel vapor feed conduit including a first end fluidically connected to the evap canister and a second end connected to the IC engine and a purge valve fluidically connected to the fuel vapor feed conduit. A fuel vapor conduit includes a first end fluidically connected to the evap canister and a second end extending into a vehicle fuel tank. A fuel vapor vent valve is fluidically connected to the fuel vapor conduit at the second end. A vapor return system includes a fuel pump, fluidically connected to the fuel vapor conduit through an intermediate bypass conduit having a first end fluidically connected to an intermediate portion of the fuel vapor conduit and a second end extending into the vehicle fuel tank and in communication with the vapor return system.

In addition to one or more of the features described herein, a fill pipe extends from a fuel inlet, accessible from the exterior of the vehicle, to a fuel outlet in fluid communication with the vehicle fuel tank. A fill pipe vapor conduit is fluidically connected to the fill pipe and has an outlet fluidically connected to the vapor return system.

In addition to one or more of the features described herein, the fuel pump comprises an eductor pump having an inlet fluidically connected to a pressurized source of fuel and a venturi member having a tapered fuel outlet with a diffuser located downstream thereof.

In addition to one or more of the features described herein, a fuel tank refueling event operates the fuel pump to draw fuel vapor through the intermediate bypass conduit and the fill pipe vapor conduit to the vapor reservoir for mixing with pressurized fuel flowing from the tapered fuel outlet and condensing at the diffuser.

In addition to one or more of the features described herein, a primary fuel pump disposed within the vehicle fuel tank delivers pressurized fuel to the IC engine via a pressurized fuel line and to the eductor pump inlet via a fuel line extending from the primary fuel pump to the inlet thereof.

In addition to one or more of the features described herein, the motor vehicle further comprises an evaporative emissions control module and a fueling sensor that signals the evaporative emissions control module that a fuel tank refueling event is in progress. Upon receiving a signal of a fuel tank refueling event the evaporative emissions control module operates the primary fuel pump and draws fuel vapor through the intermediate bypass conduit to the vapor reservoir for mixing with the pressurized fuel flowing from the tapered fuel outlet and to condense at the diffuser.

In another exemplary embodiment, method of operating an evaporative emissions control system in a motor vehicle comprises sensing at an emissions control module, via a fueling sensor, that a refueling event is in progress, opening a fuel vapor vent valve to allow fuel vapor to exit a fuel tank and be transported to an evaporative emissions canister (evap canister) via a fuel vapor conduit for storage, and activating a primary fuel pump and an eductor pump to supply pressurized fuel through a venturi member of a vapor reservoir creating low-pressure in a vapor reservoir in which the venturi member resides. The low-pressure draws fuel vapor in the fuel vapor conduit through an intermediate bypass conduit and into the vapor reservoir to condense and reenter liquid fuel in the fuel tank.

In addition to one or more of the features described herein, the method further comprises directing the pressurized fuel passing through the venturi member through a diffuser member downstream thereof.

In addition to one or more of the features described herein, the method further comprises drawing fuel vapor in a fuel fill pipe through a fill pipe vapor conduit and into the vapor reservoir to condense and reenter liquid fuel in the fuel tank.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
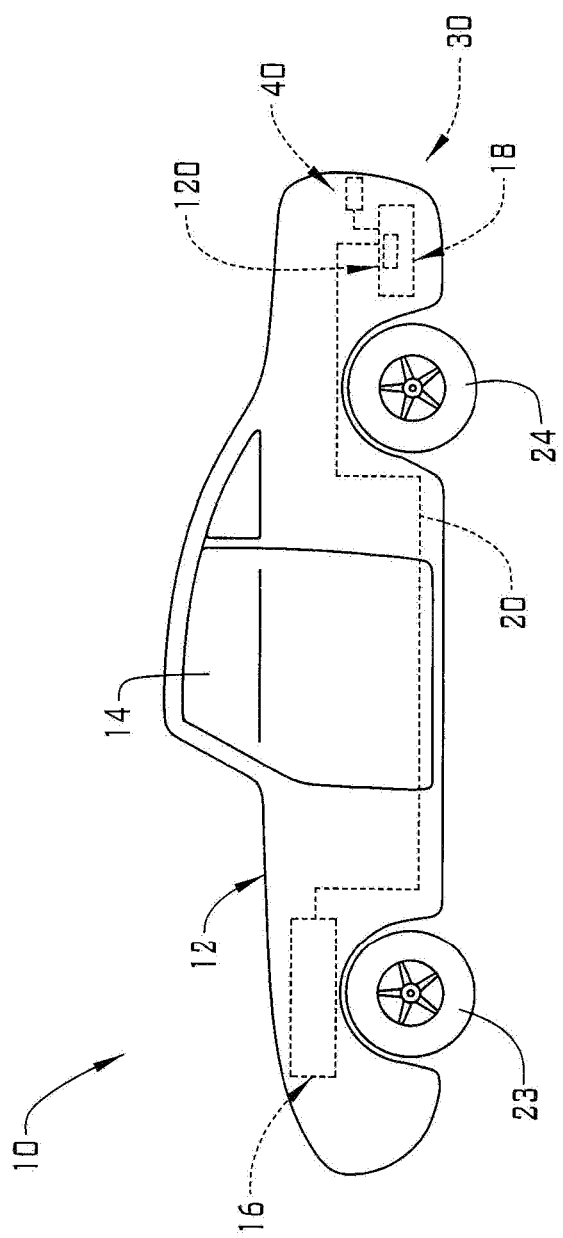
FIG. 1 depicts a motor vehicle including an evaporative emissions control system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC) an electronic circuit, a processor (shared, dedicated or group) and memory that executes one of more software or firmware programs, a combinational logic circuit, and/or other suitable component that provide the described functionality.

A motor vehicle, in accordance with an exemplary embodiment, is illustrated generally at 10 in FIG. 1. Motor vehicle 10 includes a body 12 having a passenger compartment 14. Motor vehicle 10 is powered by a prime mover in the form of an internal combustion (IC) engine 16 that receives pressurized fuel from a vehicle fuel tank 18 via a pressurized fuel line 20. Motor vehicle 10 is also shown to include front wheels 23 and rear wheels 24. Front and/or rear wheels 23, 24 are mechanically connected to IC engine 16 through, for example, one or more of a transmission (not shown), a transaxle (also not shown) or the like.

Figure 2:
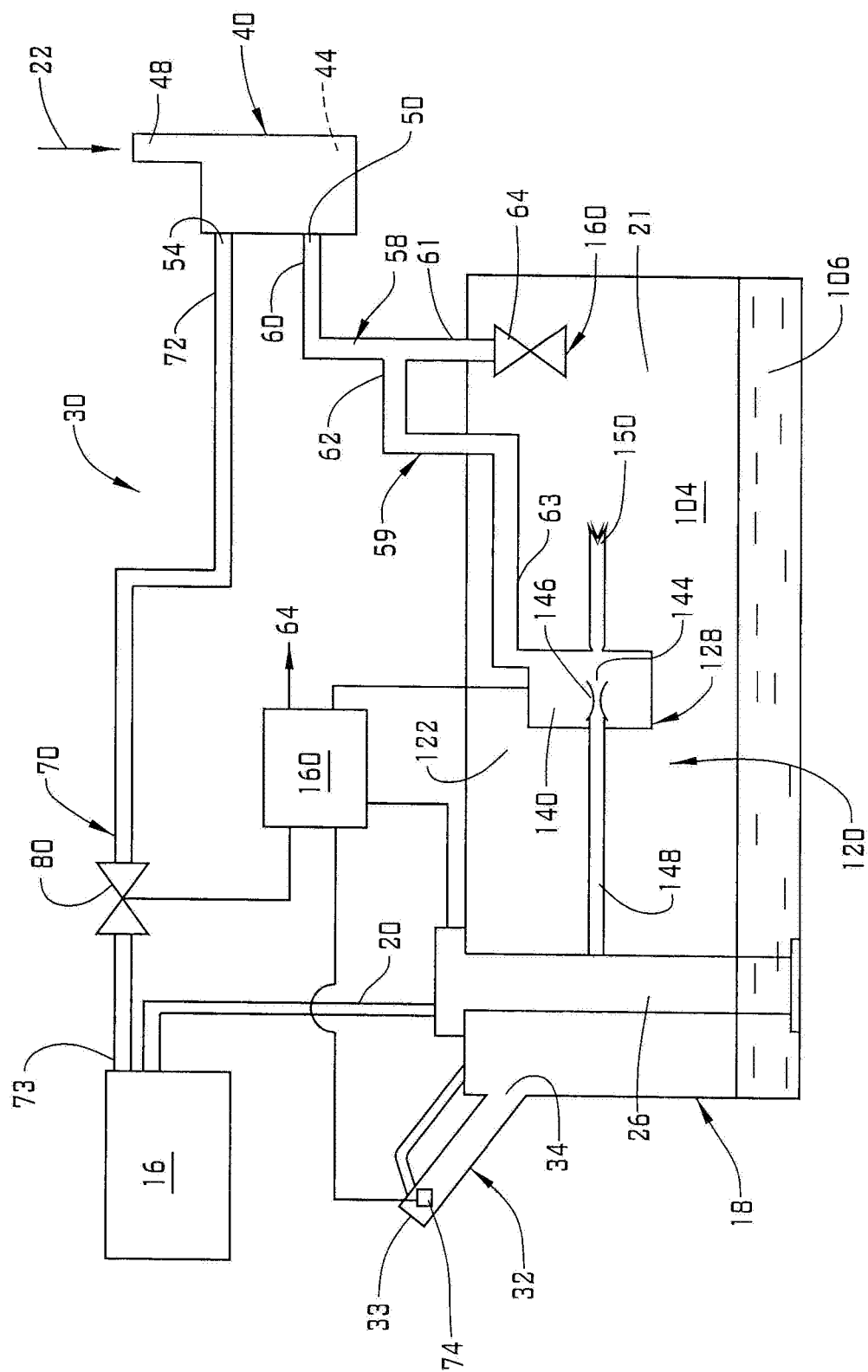
FIG. 2 is a block diagram illustrating the evaporative emission control system, in accordance with an aspect of an exemplary embodiment.

In accordance with and exemplary embodiment, motor vehicle 10 includes an evaporative emission control system 30 that collects fuel vapor 21, FIG. 2, from the vehicle fuel tank 18 and delivers the fuel vapor to the IC engine 16 or back to the vehicle fuel tank 18 to condense and mix with liquid fuel 106. Referring now to FIG. 2, with continuing reference to FIG. 1, evaporative emission control system 30 includes an evaporative emissions control canister (evap canister) 40 that may be filled with activated carbon 44 or other suitable absorbent. The activated carbon 44 absorbs and stores fuel from fuel vapor 21 venting from the vehicle fuel tank 18. In the embodiment shown, evap canister 40 includes a fresh or ambient air inlet 48, a fuel vapor inlet 50 and a fuel vapor outlet 54. Fuel vapor inlet 50 is fluidically connected to vehicle fuel tank 18 through a fuel vapor conduit 58. Fuel vapor conduit 58 includes a first end 60 that is fluidically connected to the evap canister 40 and a second end 61 that extends into vehicle fuel tank 18. The second end 61 is connected to a fuel vapor vent valve 64. Fuel vapor conduit 58 includes an intermediate bypass conduit 59 including a first end 62 fluidically connected to an intermediate portion of the fuel vapor conduit 58 and a second end 63 extending into the vehicle fuel tank 18.

In accordance with an exemplary embodiment, fuel vapor outlet 54 is fluidically connected to IC engine 16 through a fuel vapor feed conduit 70. Fuel vapor feed conduit 70 includes a first end 72 fluidically coupled to evap canister 40 at vapor outlet 54, and a second end 73 fluidically coupled to IC engine 16. A purge valve 80 may, during certain vehicle operations, open to allow fresh air 22 to be drawn through the evap canister 40 thereby pulling fuel out of the activated carbon 44, through conduit 70 and into the IC engine 16 to be combusted. Such an activity regenerates the evap canister 40 and prepares it to store additional fuel vapor 21 from the fuel tank 18.

In an exemplary embodiment, vehicle fuel tank 18 includes an interior zone 104 containing the liquid fuel 106 and the fuel vapor 21. A primary fuel pump 26 is disposed within the interior zone 104 and is configured to remain in continuous contact with the liquid fuel 106. The primary fuel pump 26 operates, during normal vehicle operation, to deliver liquid fuel 106 to the IC engine 16 via the pressurized fuel line 20. A vapor return system 120 is arranged within the interior zone 104 of the vehicle fuel tank 18. In an embodiment, the vapor return system 120 may be disposed in an upper portion of the interior zone 104 thereof. The vapor return system 120 includes a vapor reservoir 128 fluidically connected to intermediate bypass conduit 59. A secondary fuel pump 140 is arranged in vapor reservoir 128. The secondary fuel pump 140 may take the form of an eductor pump having a venturi member 146. The venturi member 146 includes an inlet that is fluidically connected to a pressurized source of fuel through fuel line 148. The fuel line 148 extends from primary fuel pump 26 to an inlet (not shown) of the venturi member. In an embodiment, the venturi 146 includes a fuel outlet 144 that is directed towards a diffuser element 150.

Figure 3:
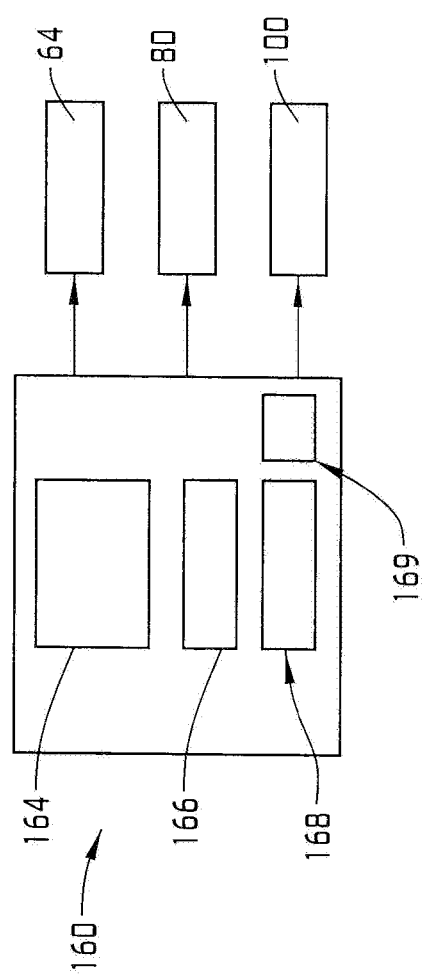
FIG. 3 is a block diagram illustrating the evaporative emission control system, in accordance with an aspect of an exemplary embodiment.

In accordance with an aspect of an embodiment, when it is desired to purge the evap canister 40 of fuel vapor during normal operation of vehicle 10, an evaporative emissions control module 160, shown in detail in FIG. 3, closes outlet valve 64 and selectively opens purge valve 80 to connect the evap canister 40 with IC engine 16. Ambient air 22 is drawn into and through the evap canister 40, exiting the canister through vapor outlet 54. As the ambient air passes through the evap canister it removes trapped fuel vapor from the activated carbon 44 thereby regenerating the evap canister 40 and preparing it for further fuel vapor loading. The fuel vapor laden ambient air is drawn through the fuel vapor feed conduit 70 and to the IC engine 16 for combustion. The evaporative emissions control module 160 may include a central processing unit (CPU) 164, a non-volatile memory 166, an evaporative valve control module 168 and a fuel pump control module 169. It is to be understood that central processing unit (CPU) 164, non-volatile memory 166, evaporative valve control module 168 and fuel pump control module 169 may be co-located or may be arranged in separate areas of the motor vehicle 10.

As discussed herein, vehicle refueling generates a significant fuel vapor load on the evap canister 40 as liquid fuel 106 entering the fuel tank 18 displaces fuel vapor 21 above the level of the liquid fuel 106. In an embodiment, vehicle refueling is achieved via a fuel tank fill pipe 32. The fill pipe 32 extends from a fuel inlet 33, that is accessible from the exterior of the vehicle 10, to a fuel outlet 34 that is in fluid communication with the interior zone 104 of the fuel tank 18. A fuel station filling nozzle (not shown) engages the fuel inlet 33 and dispenses liquid fuel 106 into the fuel tank. In an embodiment, a fueling sensor 74 communicates with the fill pipe 32 and signals the evaporative emissions control module 160 that a refueling event is in progress. Upon receipt of a signal from fueling sensor 74 that a fueling event is in progress the evaporative emissions control module checks the status of purge valve 80 and closes the valve if it is open. Simultaneously, the fuel vapor vent valve 64 is opened to allow fuel vapor 21, displaced by the rising level of liquid fuel 106 to exit the fuel tank 18 for transport to the evap canister 40, via fuel vapor conduit 58, where it may be stored by the activated carbon 44. To reduce the quantity of fuel vapor 21 that is directed to the evap canister 40 during refueling, the evaporative emissions control module will, upon opening of the fuel vapor vent valve 64, following the receipt of a signal from the fueling sensor 74 that a fueling event is underway, activate primary fuel pump 26 and eductor pump 140 via a signal from fuel pump control module 169.

In accordance with an embodiment, activation of primary fuel pump 26 supplies pressurized fuel through fuel line 148 and into the fuel inlet of venturi member 146. The pressurized fuel flows out of the tapered fuel outlet 144 toward diffuser element 150 creating low-pressure in the vapor reservoir 128. The low-pressure developed by fuel flowing through venturi member 146 draws a portion of the fuel vapor exiting the interior zone 104 of the fuel tank 18 via the fuel vapor conduit 58 through intermediate bypass conduit 59 and into vapor reservoir 128. The fuel vapor entering the vapor reservoir 128 through intermediate bypass conduit 59 mixes with the pressurized fuel flowing from the venturi member 146 through diffuser member 150. Uncondensed fuel vapor condenses as it passes through the diffuser 150 and reenters the liquid fuel 106. Termination of the fueling event results in the fueling sensor 74 signaling the evaporative emissions control module 160 to close the fuel vapor vent valve 64 and deactivate primary fuel pump 26 and eductor pump 140.

Figure 4:
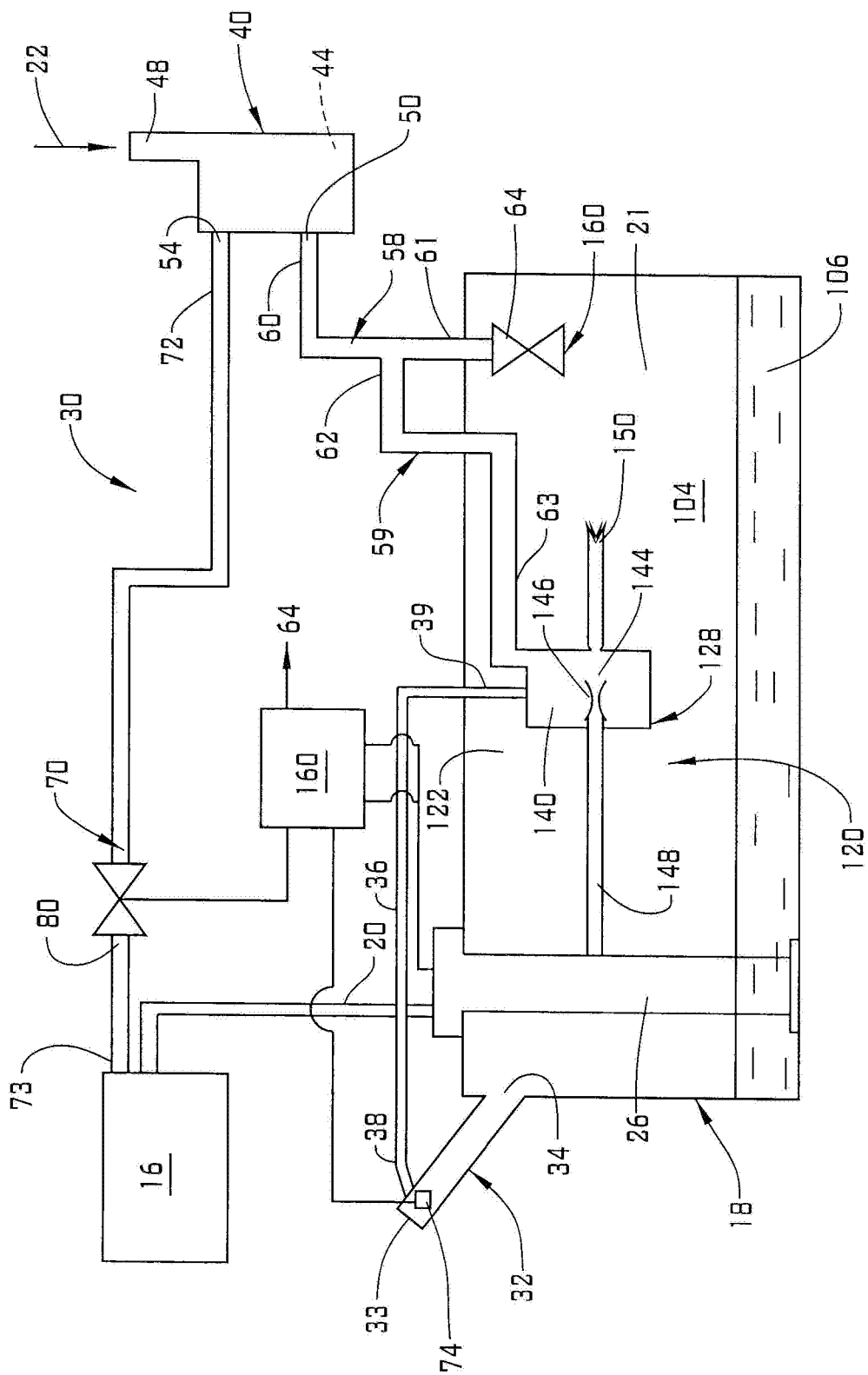
FIG. 4 is a block diagram illustrating the evaporative emission control system, in accordance with another aspect of an exemplary embodiment.

Reference will now follow to FIG. 4 in describing an evaporative emissions system 30 in accordance with another aspect of an exemplary embodiment. For brevity, elements and operations of FIG. 4 that are similar to FIG. 2 are reused and not re-described. As discussed herein, vehicle refueling generates a significant fuel vapor load on the evap canister 40 as liquid fuel 106 entering the fuel tank 18 displaces fuel vapor 21 above the level of the liquid fuel. In addition, fuel vapor 21 may be displaced up the fill pipe 32 as the level of liquid fuel 106 rises in the fuel tank 18. To prevent the escape of fuel vapor 21 from the fill pipe 32 to the atmosphere, a fill pipe vapor conduit 36 extends between an inlet end 38, that is fluidly connected to the fuel fill pipe 32, and an outlet end 39 that is fluidly connected to the vapor reservoir 128 of the vapor return system 120. To reduce the quantity of fuel vapor 21 that is resident in the fuel fill pipe 32 during refueling, the evaporative emissions control module 160 will, upon receipt of the signal from the fueling sensor 74 that a fueling event is underway, activate primary fuel pump 26 and eductor pump 140 via a signal from fuel pump control module 169.

In accordance with an embodiment, activation of primary fuel pump 26 supplies pressurized fuel through fuel line 148 and into the fuel inlet of venturi member 146. The pressurized fuel flows out of the fuel outlet 144 toward diffuser element 150 creating low-pressure in the vapor reservoir 128. The low-pressure developed by fuel flowing through venturi member 146 draws the fuel vapor exiting the interior zone 104 of the fuel tank 18 through the fuel fill pipe 32 through fill pipe vapor conduit 36 and into vapor reservoir 128. The fuel vapor entering the vapor reservoir 128 through fill pipe vapor conduit 36 mixes with the pressurized fuel flowing from the venturi member 146 through diffuser member 150. Uncondensed fuel vapor condenses as it passes through the diffuser 150 and reenters the liquid fuel 106. Termination of the fueling event results in the fueling sensor 74 signaling the evaporative emissions control module 160 to deactivate primary fuel pump 26 and eductor pump 140.

It should be understood that, while the embodiments of FIGS. 2 and 4 have been described and illustrated separately, both may be utilized together in the evaporative emission control system 30.

While the above disclosure has been described with reference to exemplary embodiments, it will be understood that those skilled in the art that various changes may be made, and equivalents may be substituted, for elements thereof without departing from its scope. In addition, many modifications may be made to adapt a particular situation or material to the teachings of the disclosure without departing from the essential scope thereof. Therefore, it is intended that the invention not be limited to the particular embodiments disclosed but will include all embodiments falling within the scope of the application.

What is claimed is:

1. An evaporative emissions control system comprising:
   a vehicle fuel tank;
   a fuel tank fill pipe connected to the vehicle fuel tank;
   an evaporative emissions control (evap) canister;
   a fuel vapor feed conduit including a first end fluidically connected to the evap canister and a second end connected to an internal combustion (IC) engine;

a purge valve fluidically connected to the fuel vapor feed conduit;

a fuel vapor conduit including a first end fluidically connected to the evap canister and a second end extending into the vehicle fuel tank;

a fuel vapor vent valve fluidically connected to the fuel vapor conduit at the second end;

a vapor return system including a fuel pump fluidically connected to the fuel vapor conduit through an intermediate bypass conduit having a first end fluidically connected to an intermediate portion of the fuel vapor conduit and a second end extending into the vehicle fuel tank and in communication with the vapor return system; and a fill pipe vapor conduit connected between the fuel tank fill pipe and the fuel pump.

2. The evaporative emissions control system according to claim 1, wherein the fuel pump comprises an eductor pump.

3. The evaporative emissions control system according to claim 2, wherein the eductor pump includes an inlet that is fluidically connected to a pressurized source of fuel, and a tapered fuel outlet.

4. The evaporative emissions control system according to claim 3, wherein the vapor return system includes a vapor reservoir fluidically connected to the second end of the intermediate bypass conduit and having the tapered fuel outlet of the eductor pump disposed therein.

5. The evaporative emissions control system according to claim 4, wherein the vapor return system includes a diffuser fluidically connected to the vapor reservoir, the diffuser arranged downstream of the tapered fuel outlet of the eductor pump.

6. The evaporative emissions control system according to claim 5, further comprising:

an evaporative emissions control module; and a fueling sensor that signals the evaporative emissions control module that a fuel tank refueling event is in progress;

wherein, upon receiving a signal of a fuel tank refueling event the evaporative emissions control module operates the fuel pump and draws fuel vapor through the intermediate bypass conduit to the vapor reservoir for mixing with the pressurized fuel flowing from the tapered fuel outlet and condensing at the diffuser.

7. A motor vehicle comprising:

an internal combustion (IC) engine;

a vehicle fuel tank connected to the IC engine;

a fuel tank fill pipe connected to the fuel tank; and an evaporative emissions control system fluidically connected to the IC engine and the vehicle fuel tank, the evaporative emissions control system comprising:

an evaporative emissions control (evap) canister;

a fuel vapor feed conduit including a first end fluidically connected to the evap canister and a second end connected to the IC engine;

a purge valve fluidically connected to the fuel vapor feed conduit;

a fuel vapor conduit including a first end fluidically connected to the evap canister and a second end extending into a vehicle fuel tank;

a fuel vapor vent valve fluidically connected to the fuel vapor conduit at the second end;

a vapor return system including a fuel pump, fluidically connected to the fuel vapor conduit through an intermediate bypass conduit having a first end fluidically connected to an intermediate portion of the fuel vapor conduit and a second end extending into the vehicle fuel tank and in communication with a vapor reservoir of the vapor return system; and a fill pipe vapor conduit connected between the fuel tank fill pipe and the fuel pump.

8. The motor vehicle of claim 7, wherein the fuel pump comprises an eductor pump having an inlet fluidically connected to a pressurized source of fuel and a venturi member having a tapered fuel outlet with a diffuser located downstream thereof.

9. The motor vehicle of claim 8, wherein a fuel tank refueling event operates the fuel pump to draw fuel vapor through the intermediate bypass conduit and the fill pipe vapor conduit to the vapor reservoir for mixing with pressurized fuel flowing from the tapered fuel outlet and condensing at the diffuser.

10. The motor vehicle of claim 9, further comprising a primary fuel pump disposed within the vehicle fuel tank to deliver pressurized fuel to the IC engine via a pressurized fuel line and to the eductor pump inlet via a fuel line extending from the primary fuel pump to the inlet thereof.

11. The motor vehicle of claim 10, further comprising:

an evaporative emissions control module; and a fueling sensor that signals the evaporative emissions control module that a fuel tank refueling event is in progress;

wherein, upon receiving a signal of a fuel tank refueling event the evaporative emissions control module operates the primary fuel pump and draws fuel vapor through the intermediate bypass conduit to the vapor reservoir for mixing with the pressurized fuel flowing from the tapered fuel outlet and condensing at the diffuser.

12. A method of operating an evaporative emissions control system in a motor vehicle comprising:

sensing at an emissions control module, via a fueling sensor, that a refueling event is in progress;

opening a fuel vapor vent valve to allow fuel vapor to exit a fuel tank and be transported to an evaporative emissions canister (evap canister) via a fuel vapor conduit for storage; and activating a primary fuel pump and an eductor pump to supply pressurized fuel through a venturi member of a vapor reservoir creating low-pressure in a vapor reservoir in which the venturi member resides, wherein the low-pressure draws fuel vapor in the fuel vapor conduit through an intermediate bypass conduit and into the vapor reservoir to condense and reenter liquid fuel in the fuel tank, and draws fuel vapor in a fuel fill pipe through a fill pipe vapor conduit into the vapor reservoir to condense and reenter liquid fuel in the fuel tank.

13. The method of claim 12, further comprising directing the pressurized fuel passing through the venturi member through a diffuser member downstream thereof.

* * * * *